Feb. 26, 1952        G. CARR        2,586,785
HYDRAULIC CONTROL VALVE
Filed Feb. 15, 1945                        2 SHEETS—SHEET 1

INVENTOR
GEORGE CARR

By Ralph L Chappell
Attorney

Patented Feb. 26, 1952

2,586,785

UNITED STATES PATENT OFFICE 2,586,785

HYDRAULIC CONTROL VALVE

George Carr, United State Navy

Application February 15, 1945, Serial No. 577,981

3 Claims. (Cl. 277—60)

(Granted under the act of March 3, 1883, as amended April 30, 1928; 370 O. G. 757)

This invention relates to control units for fluid operating systems and more particularly to control units for aircraft hydraulic systems.

Heretofore various means have been employed for the purpose of regulating pressure in a fluid circuit and the present invention provides a new, improved and compact control unit especially designed for use in aircraft hydraulic systems though it is also capable of other uses.

It is an object of this invention to provide a light, simple and durable pressure control unit for aircraft which has a minimum number of parts and external connections.

It is a further object to provide a unitary control valve assembly which may be bodily removed, inspected, and replaced with a reconditioned and properly adjusted unit.

An additional object of the present invention is to provide a combined control unit and safety device which may broadly be used for the actuation of any mechanism operated by hydraulic or pneumatic fluid means.

Other objects and advantages will appear from a consideration of the following detailed specification. For a more complete understanding of this invention reference may now be had to the drawings, in which.

Figure 1:
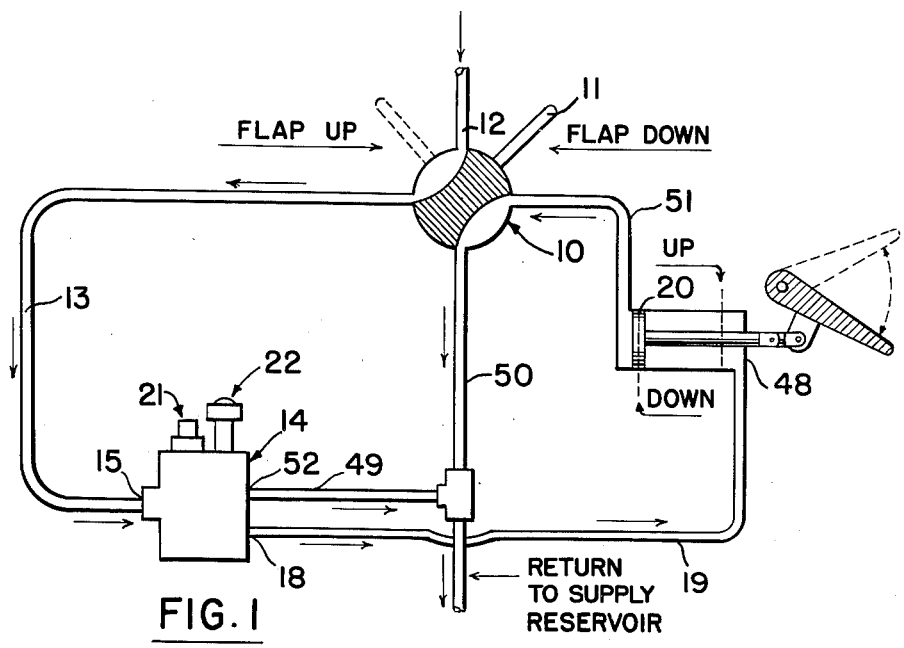
Fig. 1 is a schematic drawing of a system incorporating the control unit of the present invention.

Referring to the drawings in detail the system applying the present invention as shown in Fig. 1 includes a flap selector valve 10 having an operating handle 11 which may be adjusted to one of two positions as shown so as to direct hydraulic fluid under main system pressure selectively to opposite ends of the conventional wing flap operating cylinder.

When the control valve lever 11 moves to the right or down position as shown in Fig. 1, the main system pressure is conducted from supply line 12 through line 13 to the control unit 14 of the invention entering through port 15 (Fig. 3) on the left side of the unit. The entering hydraulic fluid under system pressure passes by a pressure regulating poppet valve 16 through passage 17 and out of the unit through outlet 18. From outlet 18 it passes through line 19 to the "down" side of a wing flap operating piston 20.

Figure 3:
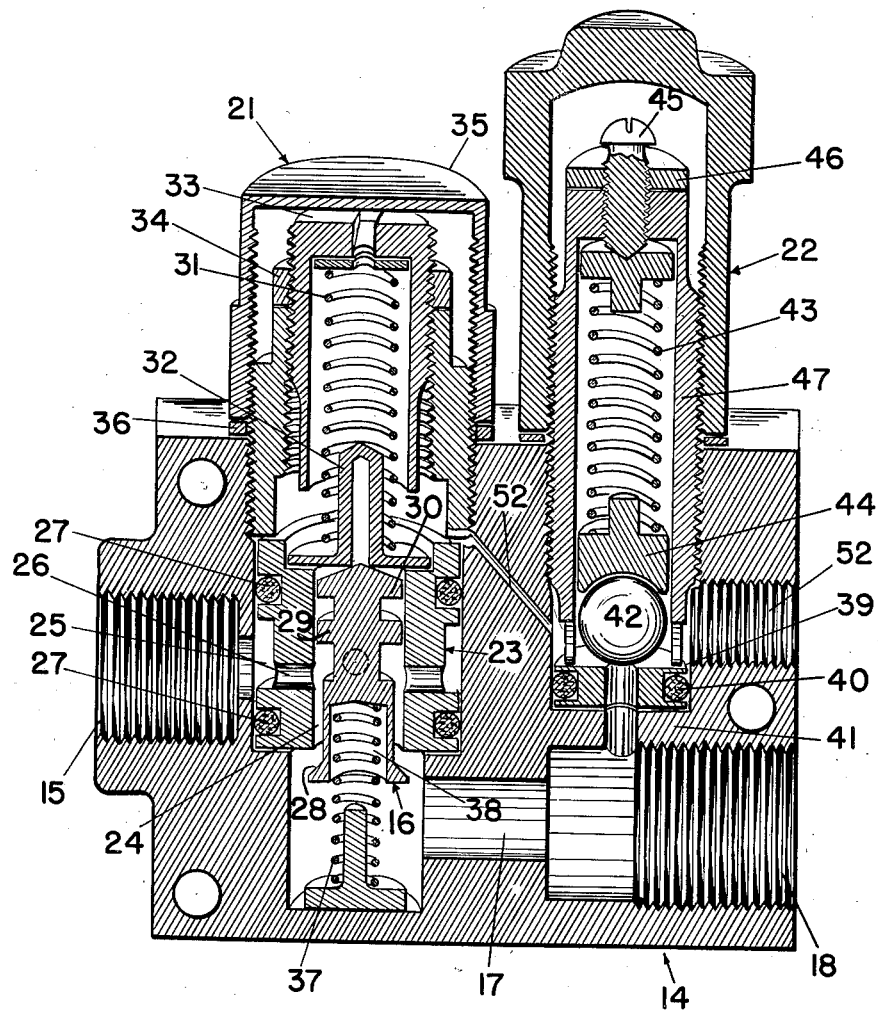
Fig. 3 is a vertical sectional view taken through the center of the control unit of the present invention.

As shown in Fig. 3, the control unit 14 is made of a single block of material having recessed openings extending into its surface and internal passages connecting certain of the openings.

Within the openings are mounted a pressure regulating unit 21 and a pressure relief unit 22.

The pressure regulating unit 21 comprises an insertable seat 23 of the construction shown having an internal axial opening 24 and an external peripheral groove 25 connecting therewith through openings 26. Ring packings 27 prevent leakage around the ends of the seat structure. The poppet valve 16 is provided with a seat engaging surface 28 and has a grooved body portion with radially extending guide lands 29 and 30 which serve to guide it within the opening 24 in the seat 23.

A spring 31 urges a follower 32 down against the upper end of the valve 16 and the amount of spring tension may be varied by adjustment of a threaded adjusting bushing 33. Adjustment is secured by locknut 34. A cover 35 protects the protruding valve assembly and is sealed by ring seal 36.

An auxiliary spring 37 bears within a recess 38 in the lower end of the poppet valve 16 and normally tends to close the valve.

The pressure relief valve 22 includes a removable seat 39 which has a peripheral seal ring 40 to prevent leakage and is provided with a central passage 41 through which the incoming fluid may pass. A ball 42 is urged against the seat by means of pressure relief valve spring 43 which bears down on a spring follower 44. The spring tension may be varied by means of adjustment screw 45 and may be locked in place by a locknut 46. A sleeve 47 has a notched lower end which bears against the seat 39 and keeps it in place.

In operation: The control handle 11 may first be moved to the desired flap operating position such as the full line position shown which connects the incoming hydraulic fluid under pressure from line 12 with line 13. Hydraulic fluid then enters the unit 14 through port 15, passes through the pressure control valve 21 leaving the unit through outlet 18. Through line 19 the fluid is connected to the "down" side of the flap operating piston 20 located in cylinder 48.

As the pressure in the discharge line 19 rises there is an increasing tendency for the back pressure by pressure on the under surface thereof to move the poppet valve 16 upwardly until, at a predetermined pressure, the valve is closed and fluid flow therethrough ceases. An example of pressures employed may be an inlet pressure of 1500 lbs. per sq. in. in line 13 and an adjustment of spring 31 to maintain a discharge pressure in line 19 of about 200 lbs. per sq. in., that is, the tension of spring 31 less the tension of spring 37 is sufficient to maintain a discharge pressure of 200 lbs. This may be accomplished because the inlet pressure presses upwardly against the under surface of guide land 29 with the same force as it exerts downwardly against the lower projecting portions of the poppet valve 16. These pressures cancel out leaving the rising pressure below the valve to close the valve at the predetermined point.

It will be obvious to those skilled in the art that the wing flap should not be securely fixed in its down position inasmuch as an undue increase in speed of the plane will impose a strain upon the flap mechanism which it is unable to bear. For that reason a relief or safety valve 22 is used which will relieve the pressure in the wing flap "down" line when the back pressure in line 19 caused by resistance of the flap to the air stream exceeds a certain set amount.

In the operation the pressure relief valve may be set, for example, to release line 19 pressure when it exceeds 400 lbs. so that when that pressure is reached the fluid may be by-passed through a return line 49 and lines 50 and 51 to the opposite side of the flap operating piston 20. This prevents cavitation on that side of the operating cylinder whenever excess air flow conditions arise.

The chamber forming the upper part of the pressure control valve assembly is vented through an internal passage 52 to the low pressure side of the ball check pressure relief valve 22 so that no pressure can build up in that chamber to interfere with operation of the poppet valve 16.

It will be apparent that when the handle 11 (Fig. 1) is moved into the dotted line position in order to raise the flaps the high pressure fluid will pass from line 12 through line 51 to move the piston to the "up" position shown and move the flap to its dotted line upper position. With the selector valve 10 in this position the fluid from the opposite side of the piston is evacuated through line 19 and the unit 14 to be returned to the supply reservoir.

Figure 2:
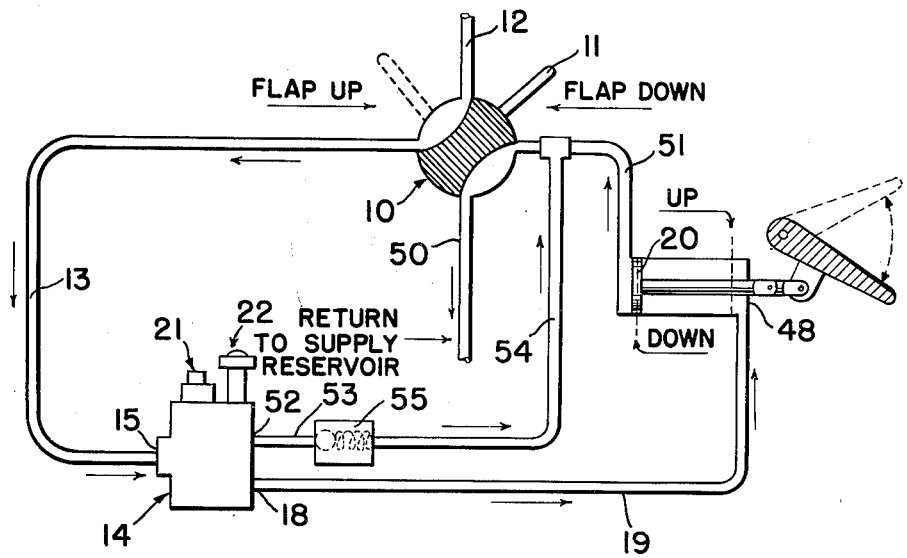
Fig. 2 shows another means of incorporating the present invention in a hydraulic system.

In the system arrangement shown in Fig. 2: The control unit low pressure outlet 52 is shown connected through a discharge line 53—54 having a second ball check valve 55 therein. In this arrangement the second ball check valve keeps high pressure from the line 51 from reaching the unit 14 during flap "up" movement.

With this alternative system shown in Fig. 2, the discharge line 54 is connected on the operating cylinder side of the selector valve 10 and return fluid must pass through selector valve 10. In the embodiment of Fig. 1 the return fluid need not pass through the selector valve 10.

It will be apparent that the present control unit is extremely easy to service inasmuch as any mechanic may make a unit replacement of the entire device and a tested and adjusted unit may be substituted for a defective one. Likewise with the present construction only three external connections need be made and all other connections and passages are internal. This is a great aid in eliminating joints and external lines which may cause system failure.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

The invention described herein may be manufactured and used by or for the Government of the United States of America for governmental purposes without the payment of any royalties thereon or therefor.

Having thus described this invention, what is claimed and desired to be secured by Letters Patent is:

1. A pressure control valve assembly for an aircraft hydraulic system, said assembly comprising a block having an inlet opening and an outlet opening, an internal passage communicated with one of said openings, and a chamber communicated with the other of said openings and said passage, a shoulder in said chamber intermediate opposite ends thereof, a seat disposed on said shoulder and having an axial bore, a peripheral groove and openings connecting the bore with the groove, a pressure regulating valve member disposed in and arranged to close said bore, said valve member having a seat contacting surface at one end thereof, said seat having a complemental surface at one end thereof to accommodate said valve member surface, a spring located in said chamber at the same end of said valve member as valve member surface and yieldingly urging said valve member toward such position as to place said surfaces in contact with each other, a valve member follower disposed in said chamber and contacted by the opposite end of said valve member, the opposite end of said seat having a land for said follower, yielding means reacting on said follower for opposing the force of said spring, means abutting said yielding means for adjusting the compressive force of said yielding means on said follower, a pressure relief unit in said block, and a passageway connecting the portion of said chamber on one side of said seat with said pressure relief unit.

2. The combination of claim 1; and means communicating said pressure relief unit with said outlet opening.

3. The combination of claim 2; and means operatively connected with said pressure relief unit for adjusting said unit.

GEORGE CARR.

REFERENCES CITED

The following references are of record in the file of this patent:

UNITED STATES PATENTS

| Number | Name | Date |
| --- | --- | --- |
| 851,981 | Cloos | Apr. 30, 1907 |
| 922,578 | Gries | May 25, 1909 |
| 1,233,885 | Kuenhold | July 17, 1917 |
| 1,242,713 | Miller | Oct. 9, 1917 |
| 1,697,865 | Hahn | Jan. 8, 1929 |
| 1,725,539 | Riley | Aug. 20, 1929 |
| 2,220,920 | Stratton | Nov. 12, 1940 |
| 2,272,091 | Loewe | Feb. 3, 1942 |
| 2,337,573 | Schultz | Dec. 28, 1943 |
| 2,424,331 | Rose | July 22, 1947 |